United States Patent [19]
Lee

[11] Patent Number: 5,823,727
[45] Date of Patent: Oct. 20, 1998

[54] ANCHOR FITTINGS FOR SECURING OBJECTS ON A ELONGATED TRACK

[76] Inventor: Ray Lee, 27082 Segovia Cir., Mission Viejo, Calif. 92691

[21] Appl. No.: 53,895

[22] Filed: Apr. 2, 1998

[51] Int. Cl.$^6$ .............................. F16B 27/00; F16B 39/00
[52] U.S. Cl. ............................. 411/85; 411/107; 411/396; 411/966
[58] Field of Search ............................... 411/84, 85, 104, 411/107, 396, 966

[56] References Cited

U.S. PATENT DOCUMENTS

| | | | |
|---|---|---|---|
| 2,936,667 | 5/1960 | Thorberg | 411/85 X |
| 4,784,554 | 11/1988 | Break | 411/85 X |
| 5,302,065 | 4/1994 | Vogg et al. | 411/107 X |

*Primary Examiner*—Neil Wilson
*Attorney, Agent, or Firm*—Edgar W. Averill, Jr.

[57] ABSTRACT

An anchor fitting assembly for securing objects on an elongated track. The track is of the type commonly used in aircraft and in various vehicles to secure seats, wheelchairs, cargo and other objects. The track has an elongated groove which has a bell-shaped profile. The top of the groove is open and has a series of opposed tabs and semicircular faces. There are many styles of fittings which are placed in such tracks and secured to the tracks. The anchor fitting assembly of the present invention has a securable fitting which has a flared based held beneath the opposed tabs of the groove. The fitting is prevented from sliding along the track by a pair of buttons which are inserted downwardly into two opposed semicircular openings adjacent the securable fitting. When an object is screwed onto the securable fitting it holds down the buttons preventing them from coming out of the semicircular openings. Two securable fittings may be placed in adjacent tabs by using the anchor fitting assembly of the present invention.

8 Claims, 2 Drawing Sheets

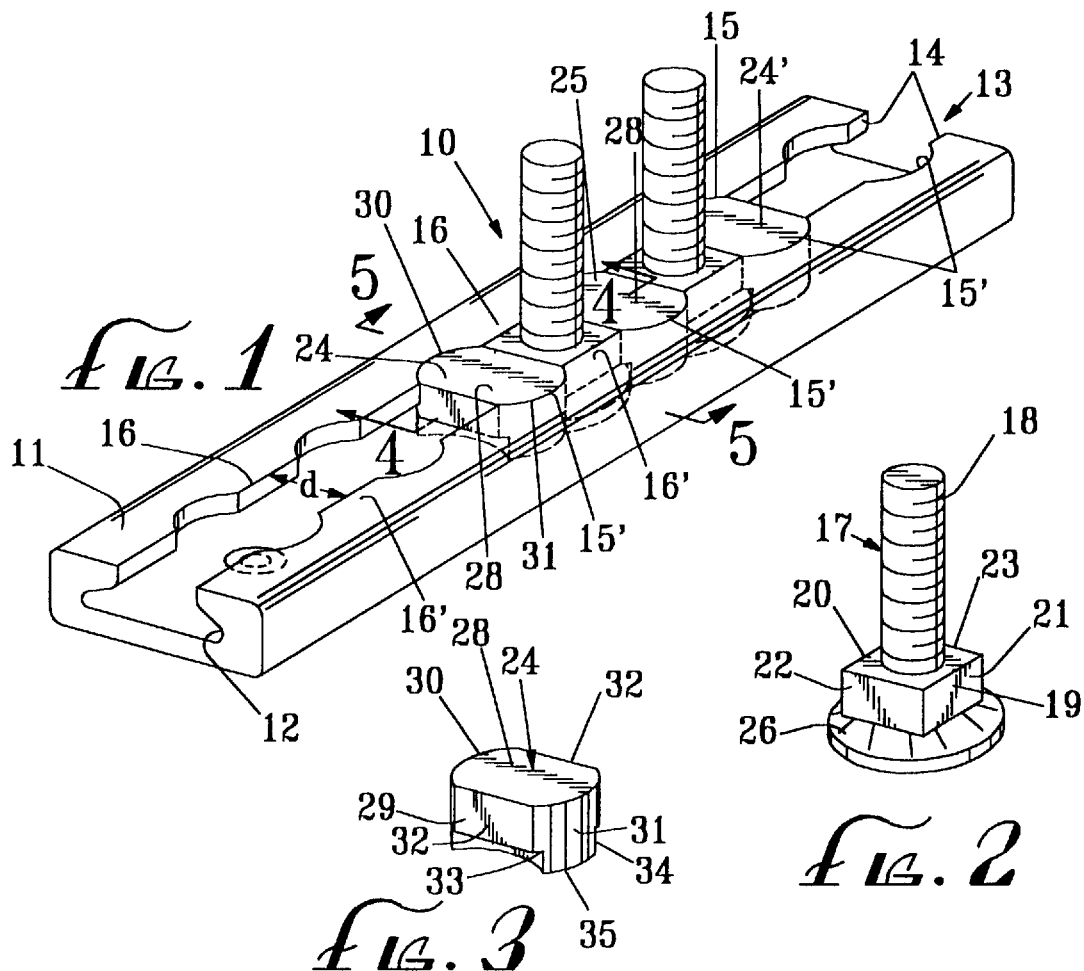
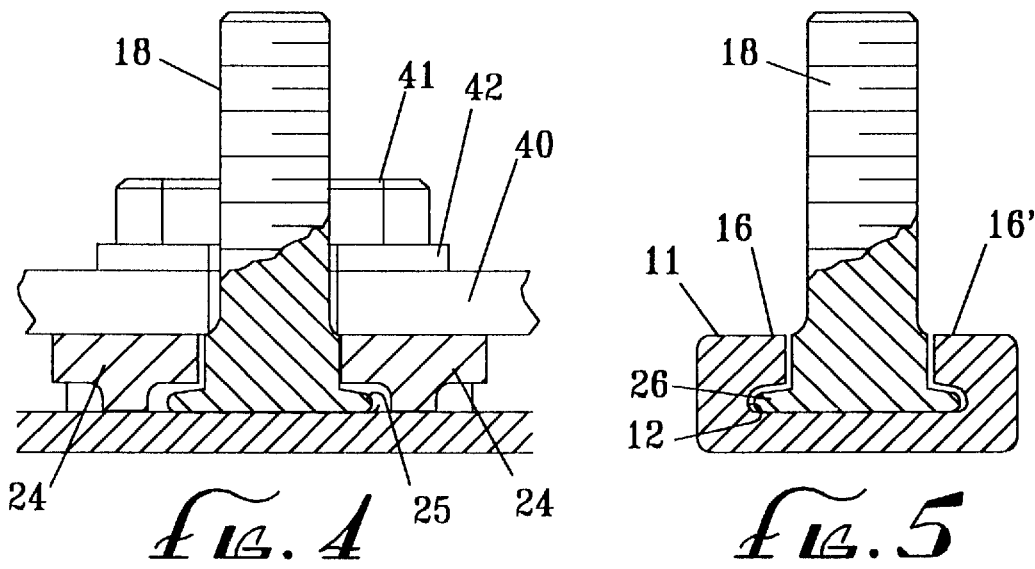

5,823,727

ANCHOR FITTINGS FOR SECURING OBJECTS ON A ELONGATED TRACK

BACKGROUND OF THE INVENTION

The field of the invention is tie-down fittings and the invention relates more particularly to fittings which are secured to elongated tracks having a series of tabs and semicircular openings.

There are numerous structures available for securement to such elongated tracks. One is shown in U.S. Pat. No. 4,771,969 where three tabs are placed downwardly to the semicircular slots. The fitting is then moved a short distance and a detent element is placed between the semicircular openings to prevent the fitting from sliding out from under the tabs in the track.

A seat mounting structure is shown in U.S. Pat. No. 3,986,649 using the same type of track described above. In this case, the seat is held in place by screwing a plunger into the track.

U.S. Pat. No. 3,677,195 shows a fitting which has a pad member. The fitting has a lever which drives a plate which holds the fitting in the track.

All of these fittings tend to have considerable structure above the upper surface of the track. In many end uses it is desirable that there be a minimum of structure above the track. It is also useful that a pair of fastening studs be placed relatively close together. It is also advantageous that the securement of the fitting be highly intuitive.

SUMMARY OF THE INVENTION

It is an object of the present invention to provide an anchor fitting for securing objects to an elongated track which anchor fitting extends a minimum of structure above the track and which permits two studs to be placed in close proximity in the track. The present invention is for an anchor fitting assembly for securing objects on an elongated track. The track is of the type which is secured to a vehicle floor and has an elongated groove with a bell shaped profile. The groove has a top with a pair of opposed edges which contain a plurality of opposed semicircular faces surrounding opposed tabs. The securable fitting has a stud portion to which objects may be secured. A track groove top abutting link is below the stud portion and touches the faces of one pair of opposed tabs. Below the track groove top abutting link is an outwardly flared base which is held in the track groove under the pair of opposed tabs. The flared base may be inserted into the track by positioning it over a pair of opposed semicircular openings and dropping it downwardly into the base of the track. A pair of buttons are placed adjacent the securable fitting. Each button has semicircular sides which closely fit against opposed semicircular faces. The buttons also have a side which faces the securable fitting and is shaped to fit closely against it. When a pair of buttons are dropped into the two pairs of semicircular openings adjacent the securable fitting, the fitting is prevented from moving out from its position beneath the opposed tabs. When an object is screwed onto the securable fitting it abuts the top of the buttons and holds them in the track, thereby securing the securable fitting permanently in place until the object is removed. A separate washer may be used to hold the securable fitting and tabs in place providing a secured stud to which other objects may be attached.

BRIEF DESCRIPTION OF THE DRAWINGS

FIG. 1 is a perspective view showing a length of track with two securable fittings and three buttons therein.

FIG. 2 is a perspective view of the securable fitting of FIG. 1.

FIG. 3 is a perspective view of one of the buttons of FIG. 1.

FIG. 4 is a cross-sectional view taken along line 4—4 of FIG. 1.

FIG. 5 is a cross-sectional view taken along line 5—5 of FIG. 1.

DESCRIPTION OF THE PREFERRED EMBODIMENTS

Figure 6:
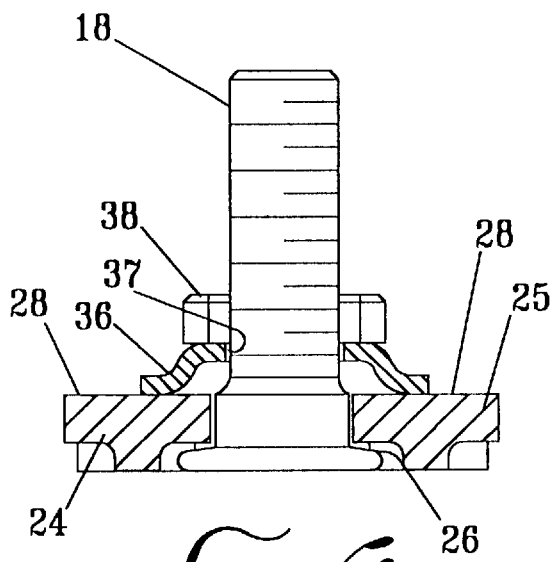
FIG. 6 is a cross-sectional view of one of the securable fittings and two of the buttons of FIG. 1, further including a button securement washer held in place by a nut.

An anchor fitting assembly for securing objects on an elongated track is shown in FIG. 1 and indicated generally by reference character 10. A conventional elongated track 11 has an elongated groove with a bell shaped profile 12 which groove has an open track groove top 13. Track groove top 13 has a pair of opposed edges 14. Opposed edges 14 have pairs of opposed semicircular faces 15 and 15' and pairs of opposed tabs 16 and 16'. With most conventional track fittings the fitting has widened tabs which are dropped downwardly through pairs of opposed semicircular faces 15–15' and then slid so the tabs are under opposed tabs 16–16' and then locked in place by various means.

Turning now to the details of anchor fitting assembly 10, a securable fitting 17 is shown in perspective view in FIG. 2 and can be seen to have a threaded stud portion 18. Below the bottom of stud portion 18 is a track groove top abutting length 19 which is shown with four sides 20, 21, 22 and 23. Two sides 20 and 21 abut the face of opposing tabs 16–16'. The other two faces 22 and 23 abut a pair of buttons 24 and 25. Button 24 is shown in perspective view in FIG. 3 and can be seen to have a flat top surface 28. It has a side area 30 and 31 which becomes surrounded by the opposed semicircular faces 15 and 15' of elongated groove 12. Side area 29 has a pair of opposed semicircular sides 30 and 31 and a pair of opposed flat side portions 32. Technically, to secure a single securable fitting 17, only one side of button 24 need have a flat side. It is convenient, however, although not essential, to provide buttons which are symmetrical so that they can be placed in any configuration.

Returning now to securable fitting 17, below the track groove top abutting length 19 is an outwardly flared base 26 which is shown as bell shaped in FIG. 2. Bell shaped base 26 is sized so that it may be dropped into the elongated groove 12 between one of the pairs of opposed semicircular faces 15–15'. Now returning to FIG. 3, the buttons, such as button 24, must be shaped so that they abut securable fitting 17 and are permitted to drop into the elongated track 11, preferably so that their top surface 28 do not extend above elongated track 11. As shown in FIG. 3, button 24 has two inwardly flared areas 33 and 34 which permit the entry of a portion of the bell shaped flared base 26 of securable fitting 27 as shown best in FIG. 4. Once buttons 24 and 25 have been put in place as shown in FIG. 4, an object generally indicated by reference character 40 is held against the track by a nut 41 and washer 42. Object 40 may be the base of a seat or any other fitting which is large enough to extend over buttons 24 and 25. In this way, the buttons are secured from being lifted out of the track because they would abut object 40. Securable fitting 17 is prevented from moving along the track by contact with buttons 24 and 25. It is, of course, prevented from moving upwardly by contact with the tabs as shown best by the cross-sectional view in FIG. 5. In FIG. 5 the bell shaped flared base 26 is in groove 12 and is below tabs 16–16'. Thus, it cannot be lifted upwardly out of track 11. Because the track groove top abutting length 19 is rectangular and more specifically square as shown in FIG. 2, it cannot turn with respect to elongated track 11.

Figure 7:
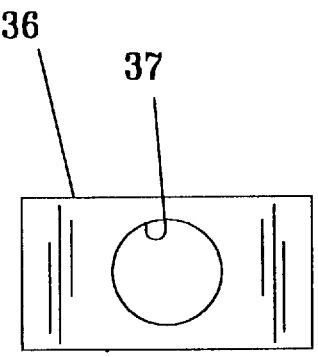
FIG. 7 is a plan view of the button securement washer of FIG. 6.

Securable fitting 17 may be held in place for later attachment of an object by a simple nut and washer combination as shown in FIGS. 6 and 7. Washer 36 has been placed over the stud portion 18 and secured against buttons 24 and 25 by nut 38. Preferable nut 38 is a lock nut so that it will remain in place in spite of vibration. When nut 38 is tightened it presses down against the top of surfaces 28 of buttons 24 and 25, thereby lifting flared base 26 which is evident from viewing FIG. 5.

A top view of button securement washer 36 is shown in FIG. 7 where the opening 37 can be seen. Opening 37 is large enough to be passed downwardly over stud portion 18.

Figure 8:
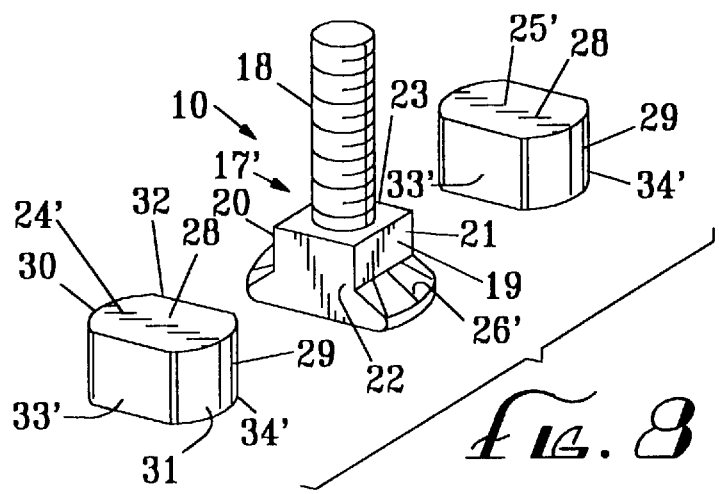
FIG. 8 is an exploded perspective view of an alternate configuration of the securable fitting and buttons of FIG. 1.

While a securable fitting 17 having a bell shaped flared base 26 as shown in FIG. 2, it can have an outwardly flared base 26' as shown in FIG. 8. Securable fitting 17' likewise has a stud portion 18 and a track groove top abutting length 19 which has sides 20 and 21 which abut the tabs 16 and 16'. It differs from the fitting 17 of FIG. 2, however, in that it has two flat sides 22 and 23. The outwardly flared base 26' is also shaped to be able to be dropped between the pairs of proposed semicircular faces 15–15' and then slid so that the base 26 is under a pair of tabs 16–16'. Next, the buttons, such as buttons 24' and 25', are dropped adjacent the fitting 17'. These buttons are shaped so that they have two opposed semicircular sides 30 and 31 and two flat sides 33 and 34. Flat side 32 abuts side 22 of fitting 17' that prevents it from moving out from under the opposed tabs.

The buttons may be fabricated from almost any material, such as high strength plastic, aluminum or steel, since they are not subjected to intense stress. The term "high strength plastic" is intended to mean a polymer that is not brittle but can withstand compression such as ABS, PVC or high impact polystyrene. Securable fitting 17 is preferably fabricated from a steel alloy. Because of the relative shape of the securable fitting 17 and the buttons, it is possible to place two studs in relatively close proximity as shown in FIG. 1 of the drawings. This is accomplished simply by adding one more securable fitting and one more button. This, of course, can be repeated as often as desired. The result is a highly economical yet highly secure fitting which can be used to secure a wide variety of objects to a conventional elongated track.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. An anchor fitting assembly (10) for securing objects on an elongated track (11) of the type secured to a vehicle floor, said elongated track having an elongated groove with a bell shaped profile (12) with a groove floor (12') and a track groove top (13) having an edge (14) with a plurality of opposed semicircular faces (15, 15') and opposed tabs (16, 16'), said fittings comprising:

a securable fitting (17) having a stud portion (18) to which objects to be secured may be attached, a track groove top abutting length (19) below said stud portion (18) having four opposed sides, two of which sides (20, 21) which closely abut a pair of opposed tabs (16, 16'), and each of the remaining two sides (22, 23) closely abut a side of an adjacent button (24, 25), and an outwardly flared base (26') below said track groove top abutting length (19), said outwardly flared base (26) being shaped to fit downwardly between said pairs of opposed semicircular faces (15, 15') and slide sideways below said opposed tabs (16, 16') and rest on a floor (12') of said elongated groove (12);

a pair of buttons (24, 25) each button having a top surface (28), a side area (29) having a pair of opposed semicircular sides (30, 31), and at least one side portion (32) which abuts one of said remaining two sides of said track groove top abutting length (19) of said securable fitting (17), and each of said buttons having sides (33', 34') being shaped to permit the positioning of each pair of buttons (24, 25) adjacent an outwardly flared base (26') of a securable fitting (17) when said pair of buttons (24, 25) are resting on said groove floor (12') of said bell shaped groove (12) whereby when an object with a flat bottom portion is secured to said stud portion (18) of said securable fitting (17) the flat bottom portion of the object prevents the buttons (24, 25) from rising out of said elongated track (11) and said buttons (24, 25) being prevented from sliding along said elongated track (11) by the contact between the pair of opposed semicircular faces (15, 15') of the track groove top (13) and the opposed semicircular sides (30, 31) of said buttons (24, 25) and the securable fitting (17) is prevented from sliding along the elongated groove (12) by contact with the buttons (24, 25).

2. The anchor fitting assembly of claim 1 wherein said track groove abutting length (19) of said securable fitting (17) is rectangular.

3. The anchor fitting assembly of claim 1 wherein said outwardly flared base (26') is a generally bell shaped flared base (26) and each of said pair of buttons (24, 25) has at least one side with a recess to accept said generally bell shaped flared base (26).

4. The anchor fitting assembly of claim 3 wherein both of said buttons (24, 25) have two opposing sides which are recessed to accept said generally bell shaped flared base (26).

5. The anchor fitting assembly of claim 1 wherein said buttons (24, 25) are fabricated from a high strength plastic.

6. The anchor fitting assembly of claim 1 further including a button securement washer (36) comprising a flat bar having a central opening (37) large enough for said stud portion (18) to pass through and said flat bar having a length sufficient to extend outwardly and abut the top surfaces (28) of said two buttons (24, 25) placable adjacent said securable fitting (17) whereby when a nut is tightened on said stud portion (18) against said button securement washer (36) the washer abuts the top surfaces (28) of the two buttons (24, 25) and secures the buttons and the securable fitting in a track.

7. The anchor fitting assembly of claim 6 wherein said button securement washer (36) has a raised center portion surrounding said center opening (37) so that a nut may tighten the securement washer against the buttons (24, 25) pressing down on the buttons, lifting up on the securable fitting (17), forcing the outwardly flared base (26') against the opposed tabs (16, 16') thereby preventing the securable fitting from rattling when so secured in an elongated track (11).

8. An anchor fitting assembly (10) for securing objects on an elongated track (11) of the type secured to a vehicle floor, said elongated track having an elongated groove with a bell shaped profile (12) with a groove floor (12') and a track groove top (13) having an edge (14) with a plurality of opposed semicircular faces (15, 15') and opposed tabs (16, 16'), said fittings comprising:

a securable fitting (17) having a stud portion (18) to which objects to be secured may be attached, a track groove top abutting length (19) below said stud portion (18) having four opposed sides, two of which sides (20, 21) which closely abut a pair of opposed tabs (16, 16'), and each of the remaining two sides (22, 23) closely abut a side of an adjacent button (24, 25), and a bell shaped flared base (26) below said track groove top abutting length (19), said bell shaped flared base (26) being shaped to closely slide in said elongated groove (12) and extending below said opposed tabs (16, 16') and rest on a floor (12') of said elongated groove (12);

a pair of buttons (24, 25) each button having a top surface (28), a side area (29) having a pair of opposed semicircular sides (30, 31), and at least one side portion (32) which abuts one of said remaining two sides of said track groove top abutting length (19) of said securable fitting (17), and each of said buttons (24, 25) having at least one inwardly flared area (33, 34) to permit the positioning of each pair of buttons (24, 25) adjacent a bell shaped flared base (26) of a securable fitting (17) when said pair of buttons (24, 25) are resting on said groove floor (12') of said bell shaped groove (12) whereby when an object with a flat bottom is secured to said stud portion (18) of said securable fitting (17) the flat bottom of the object prevents the buttons (24, 25) from rising out of said elongated track (11) and said buttons (24, 25) being prevented from sliding along said elongated track (11) by the contact between the pair of opposed semicircular faces (15, 15') of the track groove top (13) and the opposed semicircular sides (30, 31) of said buttons (24, 25) and the securable fitting (17) is prevented from sliding along the elongated groove (12) by contact with the buttons (24, 25).

* * * * *